United States Patent [19]
Fischer et al.

[11] Patent Number: 6,149,977
[45] Date of Patent: Nov. 21, 2000

[54] METHOD OF CATALYTIC CROSSLINKING OF POLYMER AND TWO-PACK COMPOSITION USED THEREIN

[75] Inventors: Gordon Charles Fischer, Horsham; Gary Robert Larson, Hatfield, both of Pa.

[73] Assignee: Rohm and Haas Company, Phila., Pa.

[21] Appl. No.: 09/286,872

[22] Filed: Apr. 6, 1999

Related U.S. Application Data

[60] Provisional application No. 60/081,491, Apr. 13, 1998.

[51] Int. Cl.$^7$ .......................................................... B05D 3/00
[52] U.S. Cl. ......................................... 427/338; 427/385.5
[58] Field of Search .................................. 427/385.5, 338

[56] References Cited

U.S. PATENT DOCUMENTS

| Re. 35,247 | 5/1996 | Cyrus, Jr. et al. | 435/150 |
|---|---|---|---|
| 3,947,324 | 3/1976 | Lakshminarayanan | 195/66 R |
| 5,292,660 | 3/1994 | Overbeek et al. | 435/262 |
| 5,512,619 | 4/1996 | DeWacker et al. | 524/56 |
| 5,520,727 | 5/1996 | Vreeland et al. | 106/205 |

FOREIGN PATENT DOCUMENTS

| 0 647 659 A1 | 4/1995 | European Pat. Off. . |
| 23 37 828 | 2/1975 | Germany . |
| 6-025462 | 2/1994 | Japan . |
| 10-001552 | 1/1998 | Japan . |
| 1 290 702 | 9/1972 | United Kingdom . |

OTHER PUBLICATIONS

Uy et al, Adv. Exp. Med. Biol. 86A, pp. 169–186, 1977.
Matheis et al, J. Protein Chem. 3(1), pp. 35–48, 1984.
Haars et al, ACS Symp. Ser., 385 (Adhes. Renewable Resour.), pp. 126–134, 1989.

European Search Report—EP 99 302577 dated Sep., 29, 1999.

Synthesis and Characterization of Polymers Produced by Horseradish Peroxidase in Dioxane, J. A. Akkara, et al., *Journal of Polymer Science: Part A: Polymer Chemistry*, vol. 29, pp. 1561–1574 (1991).

Enzymes and Life Processes, Temperature Effects, Enzyme Concentration, Effects of Inhibitors on Enzyme Activity, Substrate Concentration; Worthington Biochemical Corporation website; printed Feb. 3, 1998.

Extraction of Proteins from Sources Containing Tannins and Anionic Mucilages; H. Vilter, *Methods in Enzymology*, vol. 228, pp. 665–672 (1994).

SIGMA Catalog for Biochemicals and Reagents for Life Science Research, p. 629, pp. 812–815 (1997).

Bibliographic Information from SciFinder, *American Chemical Society*, (1997).

*Primary Examiner*—Erma Cameron
*Attorney, Agent, or Firm*—Stephen T. Falk

[57] ABSTRACT

A method of crosslinking an oxidative polymer having oxidatively crosslinkable functional groups and a two-pack composition used therein is provided. The oxidatively crosslinkable functional groups on the oxidative polymer are crosslinked by contacting the oxidative polymer with a catalytic amount of an oxidizing enzyme, such as horseradish peroxidase. The present invention is further directed to a two-pack coating composition which includes a polymeric component and a catalytic component, which are mixed together prior to use.

9 Claims, No Drawings

METHOD OF CATALYTIC CROSSLINKING OF POLYMER AND TWO-PACK COMPOSITION USED THEREIN

This application claims benefit of provisional application Ser. No. 60/081,491 filed Apr. 13, 1998.

FIELD OF THE INVENTION

This invention generally relates to a method of crosslinking polymers and more particularly relates to catalytic crosslinking of polymers having oxidatively crosslinkable functional groups. "Crosslinkable" and "crosslinking" refer to the formation of new chemical bonds between existing polymer chains.

BACKGROUND OF THE INVENTION

A number of polymers are capable of being crosslinked in the presence of a catalyst. A significant improvement in physical and chemical properties of such polymers occurs when such polymers are subjected to a crosslinking process. However, crosslinked polymers become highly viscous as a result of their increased molecular weight, which occurs due to the crosslinking process. As a result, crosslinked polymers are typically incapable of being molded into desired shapes or are incapable of being readily applied over substrate surfaces as a layer.

Thus, a catalyst is stored separately from a polymer or a polymeric component of a coating composition, which contains the polymer. Just before use the catalyst is mixed with the polymeric component to form a pot mix which can then be readily applied as a layer by conventional means, such as by brushing or spraying, over the surfaces of substrates or can be readily shaped into an article by conventional means, such as molding. The polymers in the layer then crosslink in the presence of the catalyst to form a coating on the surface having improved physical and chemical properties, such as durability, water and solvent resistance, mar resistance, block resistance compared to the uncrosslinked polymer.

Several types of catalysts are known to crosslink a polymer. For example, it is conventional to use a heavy metal catalyst, such as a tin compound for crosslinking polymers having oxidatively crosslinkable functionalities. However, these metal catalysts tend to have a low catalytic activity. As a result, a significantly higher quantity of such catalysts, generally in amounts exceeding 5000 parts per million (ppm) or in excess of 0.5 weight percent based on the total polymer solids weight, have to be added to the polymer for achieving a desired degree of crosslinking of the polymer. Moreover, these metal catalysts have adverse impact on the environment because they are hazardous to human, animal and plant habitat. Furthermore, these heavy metal catalysts cannot be readily degraded into harmless compounds. Thus, articles made from polymers containing these heavy metal catalysts or articles coated with coating compositions containing these heavy metal catalysts cannot be safely disposed of in typical land fills or other disposal sites, unless such catalysts are removed or rendered harmless before disposal. The present invention solves this problem by providing for an oxidative catalyst that has no substantially adverse impact on the environment and it readily undergoes biodegradation upon disposal. As a result, the catalyst of the present invention can be safely disposed of in conventional landfills or disposal sites without any significant impact on the environment. Furthermore, as the catalyst of the present invention is catalytically more active than conventional heavy metal catalysts, smaller amounts of the catalyst of the present invention are needed to achieve the same degree of crosslinking that is accomplished by utilizing higher amounts of conventional heavy metal catalysts.

STATEMENT OF THE INVENTION

The present invention is directed to a method of crosslinking an oxidative polymer having oxidatively crosslinkable functional groups, said method comprising:

contacting said oxidative polymer with a catalytic amount of an oxidizing enzyme; and crosslinking said oxidatively crosslinkable functional groups on said oxidative polymer.

The present invention is also directed to a method of applying a coating on a substrate comprising:

contacting a polymeric component of a coating composition with a crosslinking component of said coating composition to form a pot mix, said polymeric component comprising an oxidative polymer having oxidatively crosslinkable functional groups and said crosslinking component comprising a catalytic amount of an oxidizing enzyme;

applying a layer of said pot mix over said substrate; and crosslinking said oxidatively crosslinkable functional groups on said oxidative polymer to form said coating on said substrate.

The present invention is further directed to a two-pack coating composition comprising:

a first container containing a polymeric component, which comprises an oxidative polymer having oxidatively crosslinkable functional groups; and a second container containing a catalytic component, which comprises a catalytic amount of an oxidizing enzyme sufficient to crosslink said oxidatively crosslinkable functional groups on said oxidative polymer, when said polymeric component is mixed with said catalytic component.

DETAILED DESCRIPTION OF THE PREFERRED EMBODIMENTS

As defined herein:

"Polymer" means a dispersed, solubilized or a sequential polymer, defined below, all provided with oxidatively crosslinkable functional groups.

"Dispersed polymer" means particles of polymer colloidally dispersed and stabilized in an aqueous medium.

"Solubilized polymer" includes "Water soluble polymer", "Water reducible polymer" or a mixture thereof. Water soluble polymer means a polymer dissolved in an aqueous medium. Water reducible polymer means a polymer dissolved in water and water miscible solvent. Solubilized polymer results in a polymer solution characterized by having the self-crowding constant (K) of the Mooney equation $[1/\ln_{\eta_{rel}}=1/BC-K/2.5]$ equal to zero. By contrast, dispersed polymer has (K) equal to 1.9. The details of Mooney equation are disclosed in an article entitled "Physical Characterization of Water Dispersed and Soluble Acrylic Polymers" by Brendley et al., in "Nonpolluting Coatings and Coating Processes" published by Plenum Press, 1973 and edited by Gordon and Prane.

"Sequential polymer" means particles of a polymer colloidally dispersed and stabilized in an aqueous medium having a core/shell morphology, wherein reactable group(s) are located on the shell or on the relatively more hydrophilic portion of the sequential polymer.

"Polymer particle size" means the diameter of the polymer particles measured by using a Brookhaven Model BI-90 Particle Sizer supplied by Brookhaven Instruments Corporation, Holtsville, New York, which employs a quasi-elastic light scattering technique to measure the size of the polymer particles. The intensity of the scattering is a function of particle size. The diameter based on an intensity weighted average is used. This technique is described in Chapter 3, pages 48–61, entitled Uses and Abuses of Photon Correlation Spectroscopy in Particle Sizing by Weiner et al. in 1987 edition of American Chemical Society Symposium series. To measure the particle diameter, 0.1 to 0.2 grams of a sample of the polymer was diluted to a total of 40 milliliters (mLs) with distilled water. A two mLs portion was delivered into an acrylic cell, which was then capped. The particle size in nanometers was measured for 1000 cycles. The measurement was repeated three times and an average was reported.

"Tg of a polymer" is a measure of the hardness and melt flow of the polymer. The higher the Tg, the lesser will be the melt flow and the harder will be the coating. Tg is described in *Principles of Polymer Chemistry* (1953), Cornell University Press. The Tg can be actually measured or it can be calculated as described by Fox in *Bull. Amer. Physics Soc.*, 1, 3, page 123 (1956). Tg, as used herein, refers to actually measured values.

"GPC weight average molecular weight" means the weight average molecular weight determined by gel permeation chromatography (GPC) which is described on page 4, Chapter I of *The Characterization of Polymers* published by Rohm and Haas Company, Philadelphia, Pa. in 1976, utilizing polymethyl methacrylate as the standard. The GPC weight average molecular weight can be estimated by calculating a theory weight average molecular weight. In systems containing chain transfer agents, the theory weight average molecular weight is simply the total weight of polymerizable monomer in grams divided by the total molar amount of chain transfer agent used during the polymerization. Estimating the molecular weight of an emulsion polymer system that does not contain a chain transfer agent is more complex. A cruder estimate can be obtained by taking the total weight of polymerizable monomer in grams and dividing that quantity by the product of the molar amount of an initiator multiplied by an efficiency factor (in our persulfate initiated systems, we have used a factor of approximately 0.5). Further information on theoretical molecular weight calculations can be found in *Principles of Polymerization* 2nd edition, by George Odian published by John Wiley and Sons, New York, N.Y. in 1981 and in *Emuilsion Polymerization* edited by Irja Pirma published by Academic Press, New York, N.Y. in 1982.

For measurement of the Tg of a polymer, differential scanning calorimetry (DSC) can be used. To measure the Tg by the DSC method, the polymer samples were dried, preheated to 120° C., rapidly cooled to –100° C., and then heated to 150° C. at a rate of 20° C./minute while data was being collected. The Tg was measured at the midpoint of the inflection using the half-height method.

"Oxidative polymer" means a polymer provided with a oxidatively functional group or group(s), which are a pendant functional group or groups attached to a polymer backbone or a functional group or groups located in the polymer backbone itself. Such a group or groups crosslink in the presence of an oxidative catalyst with other such functional groups to increase the molecular weight of the crosslinked polymer and to thereby improve the physical and chemical properties of the coatings resulting therefrom.

"Inactive polymer" means a polymer having a dormant functional group or group(s), which are a pendant functional group or groups attached to the polymer backbone or a functional group or groups located in the polymer backbone itself. The dormant functional groups are latent until they are exposed to an activating agent. Thereafter, dormant functional groups on the inactive polymer are converted into an oxidatively crosslinkable functional group or groups.

"Enzyme" means a complex proteinaceous substance that acts as a catalyst. Enzymes are high molecular weight compounds made up principally of chains of amino acids linked together by peptide bonds.

"Oxidizing Enzymes" means an enzyme catalyst in whose presence oxidative functionalities on an oxidative polymer crosslink to form a crosslinked polymer.

"Substrate molecule" means a testing material which is known to have reactive sites that are specifically reactive to the enzyme catalyst being analyzed for its enzyme activity.

A "unit" relates to the enzyme activity of an enzyme catalyst and (one unit) is equal to the quantity of enzyme (in grams, milligrams moles, millimoles, or micromoles) required to produce a specified amount in grams, milligrams, micromoles or millimoles of an oxidized substrate during a defined period of time. i.e., in seconds or minutes and at a specified pH and temperature. A higher unit activity per mass (usually expressed in milligrams) of an enzyme is an indication of a catalytically more active enzyme. For oxidizing enzymes like peroxidase, the concentration of a substrate molecule which undergoes an enzyme catalyzed oxidation, is measured before and after exposure to the enzyme. By measuring the loss of this substrate or the appearance of the oxidized product over time, the unit activity can be calculated. A common substrate used to measure peroxidase activity is pyrogallol which is oxidized to purpurogallin by peroxidase. Puropurogallin is 2,3,4,6-Tetrahydroxy-5H-benzocyclohepten-5-one. Pyrogallol is 1,2,3-trihydroxybenzene.

"Swell Ratio" is a ratio of the volume of a swelled test film of a crosslinked polymer crosslinked by a catalyst or an uncrosslinked polymer, swelled by soaking it for an hour in methyl ethyl ketone to the volume of the same test film before it is soaked. The swell ratio is used to determine the degree of crosslinking, i.e., increase in the molecular weight of the polymer that results from crosslinking in the presence of an oxidative catalyst. The lower the swell ratio, higher will be the crosslinking of the polymer and vice versa.

"Two-pack" or "two-component" composition refers to a coating composition which includes a polymeric component and a crosslinking component stored separately and then mixed together shortly before use to form a pot mix.

"Pot life" refers to the period of time at the end of which the pot mix is no longer useful, which occurs when an oxidizing enzyme in the crosslinking component in the pot mix loses its potency. Such a loss of potency is indicated by a pot mix having a swell ratio of 20 or more.

"Polymer solids" means polymer in its dry state.

"(meth)acrylate" includes acrylate and methacrylate.

Ranges specified are to be read as inclusive, unless specifically identified otherwise.

The present invention is directed to a method of crosslinking an oxidative polymer having oxidatively crosslinkable functional groups. The method includes contacting the oxidative polymer with a catalytic amount of an oxidizing enzyme to crosslink the oxidative functional groups on the oxidative polymer. Any conventional contacting step, such as by mixing, may be used. Mixing with stirring is preferred to ensure uniform mixing of the oxidizing enzyme with the oxidative polymer for improving the catalytic activity of oxidizing enzyme. The contacting step is typically conducted under ambient conditions.

The oxidative polymer may be any copolymer provided with oxidatively crosslinkable functional groups. The glass transition temperature of the oxidative polymer is in the range of from −40° C. to 120° C., as measured by conventional differential scanning calorimetry (DSC).

The oxidatively crosslinkable functional groups suitable for use in the present invention include phenolic, active methylene, amino groups and combinations thereof. The foregoing oxidatively crosslinkable functional groups in the oxidative polymer may result from polymerizing the oxidative polymer from an oxidative monomer mixture that includes one or more of oxidative monomers. Alternatively, these oxidatively functional group may be also introduced through post-polymerization reaction.

Some of the phenolic oxidative monomers include vinylically, (meth)acrylically, or allylically substituted:
phenol, anisole, cresols (o, m and p), hydroxytoluene, 1,2-benzenediol, 2-hydroxybenzylalcohol, 2-methoxyphenol, 3-methoxyphenol, 3,4-dimethylphenol, 4-phenylphenol, 3-phenylphenol, 3-(3-phenoxyphenoxy)phenol, diethylstilbesterol, 1-hydroxynaphthalene, 2-hydroxynaphthalene, 1,3-dihydroxynaphthalene, and 1,5-dihydroxynaphthalene; and combinations thereof. Phenol and hydroxytoluene having vinylic, (meth)acrylic or allylic substituents are preferred. Phenol having vinylic substituents is more preferred.

By "active methylene" herein is meant the esters and amides of acetoacetic acid, malonic acid, and cyanoacetic acid. Preferred are the esters of acetoacetic acid. When monomer(s) which do not bear active methylene groups are used exclusively in the formation of the oxidative polymer or when additional acetoacetate groups are desired, acetoacetate groups may be introduced by the use of acetoacetate-functional chain transfer agents as disclosed in U.S. Pat. No. 4,960,924, hereby incorporated herein by reference, or by post-reaction of a copolymerized monomer. Cyanoacetates and cyanoacetamides may be prepared by methods known in the art as disclosed, for example, in U.S. Pat. Nos. 3,554,987; 3,658,878; and 5,021,511, hereby incorporated herein by reference. In general, any polymerizable hydroxy-or amino-functional monomer can be converted to the corresponding acetoacetate or acetoacetamide, before or after polymerization, by reaction with diketene or other suitable acetoacetylating agent (See e.g. Comparison of Methods for the Preparation of Acetoacetylated Coating Resins, Witzeman, J. S.; Dell Nottingham, W.; Det Rector, F. J. Coatings Technology; Vol. 62, 1990, 101 (and references contained therein)).

Some of the active methylene oxidative monomers include:
ethylenically unsaturated monomer bearing acetoacetate functionality such as, for example, vinyl acetoacetate, acetoacetoxyethyl acrylate, acetoacetoxyethyl methacrylate (AAEM), acetoacetoxypropyl methacrylate (AAPM), allyl acetoacetate, acetoacetoxybutyl methacrylate, 2,3-di(acetoacetoxy)propyl methacrylate, diacetoneacrylamide, acetoacetoxy dietyleneglycol methacrylate, and combinations thereof. Acetoacetoxyethyl(meth)acrylate is preferred.
Some of the amino oxidative monomers include:
tert-butylaminoethyl (meth)acrylate, dimethylaminopropyl (meth)acrylamide, dimethylaminoethyl (meth) acrylate, oxazolidinylethyl (meth)acrylate, 2-vinylpyridine or 4-vinylpyridine, aminostyrene; alkyl, aryl, or halo substitued aminostyrene; aryl or alkyl substituted diallyl-amine, vinylpiperidine, vinylimidizole, 2-morpholinoethyl (meth)acrylate, and diallyl dimethyl ammonium chloride. Aminostyrene is preferred.

Functional groups, such as, allylic, vinylic, acrylic, methacrylic, itaconic, maleic, mercapto, sulfide, phosphino may be introduced through post-polymerization reaction to also provide the oxidative polymer with oxidative functionalities.

The amount of oxidative monomers in the oxidative monomer mixture is adjusted to provide a single chain of the oxidative polymer resulting therefrom with at least two oxidatively crosslinkable functional groups. Depending upon the degree of crosslinking desired, the amount of oxidative monomers in the oxidative monomer mixture may vary in the range of from 2 to 90 weight percent, preferably in the range of from 5 to 25 based on total polymer solids.

The oxidatively crosslinkable functional groups of the oxidative polymer may be either in the backbone or attached to the polymer backbone as pendent moieties. The number of functional groups per chain of the oxidative polymer depends upon the GPC weight average molecular weight of the oxidative polymer and the molecular weight of the functional group. Thus, oxidative polymers having a GPC weight average molecular weight of 500,000 or greater, preferably in the range of from 500,000 to 2,000,000 may have in the range of from 2 to 4000, preferably in the range of from 6 to 3,000, of the oxidatively crosslinkable functional groups having a molecular weight in the range of from 50 to 500, preferably in the range of from 70 to 220. For oxidative polymers having GPC weight average molecular weight of less than 500,000, preferably in the range of from 5,000 to 500,000, may have in the range of from 2 to 2000, preferably in the range of from 10 to 600, of the oxidatively crosslinkable functional groups having molecular weight in the range of from 50 to 500, preferably in the range of 70 to 220.

The remainder of the monomers in the oxidative monomer mixture from which the oxidative polymer is polymerized, include at least one of the following:

An ethylenically unsaturated monomer, such as, for example, acrylic ester monomers including methyl acrylate, ethyl acrylate, butyl acrylate, 2-ethylhexyl acrylate, decyl acrylate, methyl methacrylate, ethyl methacrylate, butyl methacrylate, lauryl (meth)acrylate, isobornyl (meth) acrylate, isodecyl (meth)acrylate, oleyl (meth)acrylate, palmityl (meth)acrylate, stearyl (meth)acrylate, glycidyl (meth)acrylate, hydroxyethyl (meth)acrylate, and hydroxypropyl (meth)acrylate; (meth)acrylamide or substituted (meth)acrylamides, substituted with alpha-alkyl or aryl groups or N-alkyl or aryl groups; styrene or substituted styrenes, which are substituted with alkyl, aryl, alkoxy, chloro, bromo, iodo, or nitro groups; butadiene; ethylene; vinyl acetate; vinyl ester of "Versatic" acid (a tertiary monocarboxylic acid having $C_9$, $C_{10}$ and $C_{11}$ chain length, the vinyl ester is also known as "vinyl versatate"); or other vinyl esters; vinyl monomers, such as, for example, vinyl chloride, vinylidene chloride, N-vinyl pyrrolidone; chloroprene and acrylonitrile or methacrylonitrile. Additionally copolymerizable ethylenically-unsaturated acid monomers in the range of from 0.1% to 50%, by weight based on the total weight of polymer solids of an acrylic acid, methacrylic acid, crotonic acid, itaconic acid, fumaric acid, maleic acid, monometlyl itaconate, monomethyl fumarate, monobutyl fumarate, maleic anhydride, 2-acrylamido-2-methyl-1-propanesulfonic acid, sodium vinyl sulfonate, phosphoethyl methacrylate, and combinations thereof may be used.

The oxidative polymer is preferably polymerized from an oxidative monomer mixture that includes, in addition to the oxidative monomer(s), at least one or more monoethylenically unsaturated monomer selected from the group consisting of methyl methacrylate, butyl acrylate, butyl methacrylate, ethyl acrylate, ethylhexyl acrylate, styrene, methyl styrene and mixtures thereof.

Even more preferred oxidative polymer is polymerized from an oxidative monomer mixture that includes, in addition to the oxidative monomer(s), at least one or more of the following monomeric mixtures:

1) butyl acrylate and methyl methacrylate,
2) butyl methacrylate and methyl methacrylate,
3) butyl acrylate and styrene,
4) 2-ethylhexyl acrylate with methyl methacrylate, or
5) 2-ethylhexyl acrylate with styrene.

The oxidative polymer may be prepared by any known procedures, such as emulsion polymerization, solution polymerization, dispersion polymerization, and solid phase polymerization. Emulsion polymerization is preferred. Some of the emulsion polymerization procedures are provided in well known texts on the subject such as "Emulsion Polymerization: Theory and Practice" by D. C. Blackley published by Wiley in 1975 and "Emulsion Polymerization" by F. A. Bovey et al. published by Interscience Publishers in 1965.

The polymerization techniques used to prepare a dispersed oxidative polymer are well known in the art. The dispersed oxidative polymers are preferably prepared by emulsion polymerization. Either thermal or redox initiation processes may be used. Redox systems using the same initiators may be used at similar levels as thermal systems when coupled with a suitable reductant such as, for example, isoascorbic acid and sodium bisulfite.

The polymerization process is typically initiated by conventional free radical initiators, such as, for example, hydrogen peroxide, benzoyl peroxide, t-butyl hydroperoxide, t-butyl peroctoate, ammonium and alkali persulfates, typically at a level of 0.05% to 3.0% by weight, based on the weight of total monomer.

The composition of the oxidative polymer may contain one or more conventional chain-transfer agents for controlling the molecular weight of the resulting oxidative polymer. Suitable chain transfer agents include, for example, $C_1$ to $C_{12}$ alkyl or functional alkyl mercaptans, alkyl or functional alkyl mercaptoalkanoates or halogenated hydrocarbons, which may be employed at levels in the range of from about 0.1 percent to about 10 percent by weight based on total polymer solids.

If desired, the oxidative polymer may be a sequential polymer, which includes particles containing two or more polymeric phases, such as, for example, an inner phase, and an outer phase, wherein the outer phase is the predominant phase in contact with the aqueous medium in which the particle is dispersed. Some particles containing two or more polymeric phases include core/shell particles, core/shell particles with shell phases incompletely encapsulating the core, core/shell particles with a multiplicity of cores, or interpenetrating network particles. The oxidatively crosslinkable functional groups of the sequential polymer are preferably provided on the shell or on the outer phase.

The sequential polymers are prepared by conventional emulsion polymerization process, preferably by well known multi-stage emulsion polymerization, in which at least two stages differing in composition are formed in a sequential fashion. Such a process usually results in the formation of at least two mutually incompatible polymer compositions, thereby resulting in the formation of at least two phases. Each stage of the sequential polymer particles may contain the same monomers, chain transfer agents, surfactants, as those disclosed earlier for the dispersed oxidative polymer. The emulsion polymerization techniques used for preparing such sequential polymers are well known in the art and are disclosed, for example, in the U.S. Pat. Nos. 4,325,856, 4,654,397 and 4,814,373, which are incorporated herein by reference.

Alternatively, the oxidatively crosslinkable functional groups on the oxidative polymer may be produced by contacting an inactive polymer having dormant functional groups with an activating amount of an activating agent.

The inactive polymer may be any copolymer provided with dormant functional groups. The glass transition temperature of the inactive polymer is in the range of from −40° C. to 120° C., as measured by conventional differential scanning calorimetry (DSC).

The dormant monomers which contain dormant functional groups suitable for use in the present invention include, but are not limited to, vinylic, allyic, or (meth) acrylic ester substituted acetoxybenzene, acetoxytoluene, acetoxyanisole, acetoxycresols (o, m and p), diacetoxybenzene, acetoxybenzylalcohol, 2-nitroacetoxybenzene, 3-nitroacetoxybenzene, 4-nitroacetoxybenzene, 2-methoxyacetoxybenzene, 3-methoxyacetoxybenzene, 4-methoxyacetoxybenzene, 3-phenylacetoxybenzene, 2-phenoxyacetoxybenzene, diethylacetoxystilbene, 1-acetoxynaphthalene, 2-acetoxynaphthalene, 1,3-diacetoxynaphthalene, 1,5-diacetoxynaphthalene, 2-propylacetoxysytrene, 2-propylacetoxysytrene, 3-propylacetoxysytrene, 4-propylacetoxysytrene, 2-propylacetoxytoluene, 2-propylacetoxytoluene, 3-propylacetoxytoluene, 4-propylacetoxytoluene, 2-propylacetoxycreosol, 2-bromoacetoxybenzene, 2-bromoacetoxybenzene, 3-bromoacetoxybenzene, 4-bromoacetoxybenzene, 2,3-dibromoacetoxybenzene, 2-chloroacetoxybenzene, 3-chloroacetoxybenzene, 4-chloroacetoxybenzene, 2,3-dichloroacetoxybenzene, 2-iodoacetoxybenzene, 2,3-diiodoacetoxybenzene, 3-iodoacetoxybenzene, 4-iodoacetoxybenzene, 2-fluoroacetoxybenzene, 3-fluoroacetoxybenzene, 4-fluoroacetoxybenzene, 2,3-difloroacetoxybenzene, 2,4-difloroacetoxybenzene, 2-fluoro-3-ethylacetoxybenzene, 2-bromoacetoxybenzoic acid, 2-bromoacetoxybenzoic acid, 3-bromoacetoxybenzoic acid, 4-bromoacetoxybenzoic acid, 2,3-dibromoacetoxybenzoic acid, 2-chloroacetoxybenzoic acid, 3-chloroacetoxybenzoic acid, 4-chloroacetoxybenzoic acid, 2,3-dichloroacetoxybenzoic acid, 2-iodoacetoxybenzoic acid, 2,3-diiodoacetoxybenzoic acid, 3-iodoacetoxybenzoic acid, 4-iodoacetoxybenzoic acid, 2-fluoroacetoxybenzoic acid, 3-fluoroacetoxybenzoic acid, 4-fluoroacetoxybenzoic acid, 2,3-difloroacetoxybenzoic acid, 2,4-difloroacetoxybenzoic acid, 2-fluoro-3-ethylacetoxybenzoic acid, 2-bromoacetoxybenzoic acid ethyl ester, 2-bromoacetoxybenzoic acid ethyl ester, 3-bromoacetoxybenzoic acid ethyl ester, 4-bromoacetoxybenzoic acid ethyl ester, 2,3-dibromoacetoxybenzoic acid ethyl ester, 2-chloroacetoxybenzoic acid ethyl ester, 3-chloroacetoxybenzoic acid ethyl ester, 4-chloroacetoxybenzoic acid ethyl ester, 2,3- dichloroacetoxybenzoic acid ethyl ester, 2-iodoacetoxybenzoic acid ethyl ester, 2,3-diiodoacetoxybenzoic acid ethyl ester, 3-iodoacetoxybenzoic acid ethyl ester, 4-iodoacetoxybenzoic acid ethyl ester, 2-fluoroacetoxybenzoic acid ethyl ester, 3-fluoroacetoxybenzoic acid ethyl ester, 4-fluoroacetoxybenzoic acid ethyl ester, 2,3-difloroacetoxybenzoic acid ethyl ester, 2,4-difloroacetoxybenzoic acid ethyl ester, 2-fluoro-3-ethylacetoxybenzoic acid ethyl ester , acetamidobenzene, acetamidotoluene, acetamidoanisole, acetamidocresols (o, m and p), diacetamidobenzene, acetamidobenzylalcohol, 2-methoxyacetamidobenzene, 3-methoxyacetamidobenzene, 4-methoxyacetamidobenzene, 3-phenylacetamidobenzene, 2-phenoxyacetamidobenzene, diethylacetamidostilbene, 1-acetamidonaphthalene, 2-acetamidonaphthalene, 1,3-diacetamidonaphthalene, 1,5-diacetamidonaphthalene, 2-propylacetamidosytrene, 2-propylacetamidosytrene, 3-propylacetamidosytrene, 4-propylacetamidosytrene, 2-propylacetamidotoluene, 2-propylacetamidotoluene, 3-propylacetamidotoluene, 4-propylacetamidotoluene, 2-propylacetamidocreosol, 2-bromoacetamidobenzene, 2-bromoacetamidobenzene, 3-bromoacetamidobenzene, 4-bromoacetamidobenzene, 2,3-dibromoacetamidobenzene, 2-chloroacetamidobenzene, 3-chloroacetamidobenzene, 4-chloroacetamidobenzene, 2,3-dichloroacetamidobenzene, 2-iodoacetamidobenzene, 2,3-diiodoacetamidobenzene, 3-iodoacetamidobenzene, 4-iodoacetamidobenzene, 2-fluoroacetamidobenzene, 3-fluoroacetamidobenzene, 4-fluoroacetamidobenzene, 2,3-difloroacetamidobenzene, 2,4-difloroacetamidobenzene, 2-fluoro-3-ethylacetamidobenzene, acetamidobenzylalcohol, 2-nitroacetamidobenzene, 3-nitroacetamidobenzene, 4-nitroacetamidobenzene, 2-bromoacetamidobenzoic acid, 2-bromoacetamidobenzoic acid, 3-bromoacetamidobenzoic acid, 4-bromoacetamidobenzoic acid, 2,3-dibromoacetamidobenzoic acid, 2-chloroacetamidobenzoic acid, 3-chloroacetamidobenzoic acid, 4-chloroacetamidobenzoic acid, 2,3-dichloroacetamidobenzoic acid, 2-iodoacetamidobenzoic acid, 2,3-diiodoacetamidobenzoic acid, 3-iodoacetamidobenzoic acid, 4-iodoacetamidobenzoic acid, 2-fluoroacetamidobenzoic acid, 3-fluoroacetamidobenzoic acid, 4-fluoroacetamidobenzoic acid, 2,3-difloroacetamidobenzoic acid, 2,4-difloroacetamidobenzoic acid, 2-fluoro-3-ethylacetamidobenzoic acid 2-bromoacetamidobenzoic acid ethyl ester, 2-bromoacetamidobenzoic acid ethyl ester, 3-bromoacetamidobenzoic acid ethyl ester, 4-bromoacetamidobenzoic acid ethyl ester, 2,3-dibromoacetamidobenzoic acid ethyl ester, 2-chloroacetamidobenzoic acid ethyl ester, 3-chloroacetamidobenzoic acid ethyl ester, 4-chloroacetamidobenzoic acid ethyl ester, 2,3-dichloroacetamidobenzoic acid ethyl ester, 2-iodoacetamidobenzoic acid ethyl ester, 2,3-diiodoacetamidobenzoic acid ethyl ester, 3-iodoacetamidobenzoic acid ethyl ester, 4-iodoacetamidobenzoic acid ethyl ester, 2-fluoroacetamidobenzoic acid ethyl ester, 3-fluoroacetamidobenzoic acid ethyl ester, 4-fluoroacetamidobenzoic acid ethyl ester, 2,3-difloroacetamidobenzoic acid ethyl ester, 2,4-difloroacetamidobenzoic acid ethyl ester, 2-fluoro-3-ethylacetamidobenzoic acid ethyl ester; O-propanoylphenol, O-butanoylphenol, O-pentanoylphenol, O-hexanolylphenol, O-heptanoylphenol, O-octanoylphenol, O-nonanoylphenol, O-decanoylphenol, O-dodecanoylphenol, O-benzoylphenol, N-benzoylaminobenzene, N-propanoylaminobenzene, N-butanoylaminobenzene, N-pentanoylaminobenzene, N-hexanoylaminobenzene, N-heptanoylaminobenzene, N-octanoylaminobenzene, N-nonanoylaminobenzene, N-decanoylaminobenzene, N-dodecanoylaminobenzene, phenolic phosphate esters and, mono and dialkyl phenolic phosphate ester where the phenolic substituent can be optionally substituted with alky, aryl, alkoxy, phenoxy, halo, nitro, and sulfonyl groups; and combinations thereof. The foregoing dormant functional groups in the inactive polymer may result from polymerizing the dormant monomer mixture which includes one or more of dormant monomers. Alternatively, these dormant functional group may be also introduced through post-polymerization reaction.

The amount of dormant monomers in the dormant monomer mixture is adjusted to provide at least two dormant functional groups per inactive polymer chain. Depending upon the degree of crosslinking desired, the amount of dormant monomers in the dormant monomer mixture may vary in the range of from 2 to 90 weight percent, preferably in the range of from 5 to 25 based on total polymer solids.

The dormant functional groups of the inactive polymer may be either in the backbone or attached to the inactive polymer backbone as pendent moieties. The number of functional groups per chain of the inactive polymer depends upon the GPC weight average molecular weight of the inactive polymer and the molecular weight of the functional group. Thus, inactive polymers having a GPC weight average molecular weight of 500,000 or greater, preferably in the range of from 500,000 to 2,000,000 may have in the range of from 2 to 4000, preferably in the range of from 6 to 3,000, of the dormant functional groups having a molecular weight in the range of from 50 to 500, preferably in the range of from 70 to 220. For inactive polymers having GPC weight average molecular weight of less than 500,000, preferably in the range of from 5,000 to 500,000, may have in the range of from 2 to 2000, preferably in the range of from 10 to 600, of the dormant functional groups having molecular weight in the range of from 50 to 500, preferably in the range of 70 to 220.

The remainder of the monomers in the dormant monomer mixture from which the inactive polymer is polymerized are the same as those listed earlier for the oxidative polymer. The manner in which the inactive polymer is polymerized is the same process as that used in the polymerization of the oxidative polymer described earlier.

The activating agent is selected from the group consisting of an activating acid, activating base, activating enzyme, and combinations thereof. An activating enzyme is preferred.

The activating amount of the activating enzyme used in activating the dormant functional groups on the inactive polymer into the oxidatively crosslinkable functional groups generally varies in the range of from 10 parts per million (ppm) to 50,000 ppm, preferably in the range of from 100 ppm to 10,000 ppm and most preferably in the range of from 100 ppm to 500 ppm based on total polymer solids. The foregoing quantities are based on using substantially pure activating agents. Correspondingly higher activating amount of the activating enzyme would be required when lesser pure activating enzyme is used.

Activating acids include but are not limited to hydrochloric, nitric, sulfuric, trifluoroacetic, phosphoric acids, and combinations thereof. Activating bases include but are not limited to lithium hydroxide, sodium hydroxide, potassium hydroxide, sodium methoxide, sodium ethoxide, ammonium hydroxide, and combinations thereof. Activating acids and bases are used in the range of from 0.25 molar equivalents to 2.0 molar equivalents per mole of dormant functional group present in the inactive polymer, preferably in the range of from 0.75 molar equivalents to 1.25 molar equivalents per mole of dormant functional group present in the inactive polymer.

The activating enzyme suitable for use in the present invention include lipase (EC 3.1.1.3), esterase (EC 3.1.1.1), and phosphatase (EC 3.1.3.1), or mixtures thereof. Activating enzymes generally have a unit activity in the range of from 10 to 500,000, preferably in the range of from 100 to 500,000 per mg of enzyme solids. Lipase, which has a unit activity in the range of from 10 to 500,000 preferably in the range of from 1000 to 500,000 per mg of enzyme solids is particularly preferred.

The activating enzymes may be employed in the form of a powder, solution, or a dispersion. The activating enzymes dispersed in water are preferred and those dispersed in buffered water are more preferred. All enzymes are given an Enzyme Commission (E.C.) number under the Enzyme Commission Classification Scheme so that each enzyme can be uniquely identified. All E.C. numbers have four fields separated by periods, for example, in "E.C. 1.2.3.4", the extreme left numeral represents the most broad classification for the enzyme. The numerals thereafter represent a finer division of that broad category. The third numeral provides for a more detailed information and the fourth numeral (extreme right field) defines the specific enzyme. For example:

"Lipase" (acylhydrolase, EC 3.1.1.3) and "esterase" (carboxylic-ester hydrolase, EC 3.1.1.1) catalyze the hydrolysis and formation of ester and amide bonds. "Phosphatase" (Phosphoric monoester phosphohydrolase, EC 3.1.3.1) catalyzes the hydrolysis of phosphate esters. See pages 652, 432, and 832, respectivily, of Sigma 1997 catalog entitled "BIOCHEMICALS AND REAGENTS FOR LIFE SCIENCE RESEARCH", supplied by Sigma Chemical, PO Box 14508, St. Louis, Mo. 63178.

The degree of activation of the dormant groups into oxidatively crosslinkable function groups achieved depends on the activity of the activating enzyme used, its purity, the presence of a co-factor during the activation process, temperature and the pH of the pot mix that results from the mixing of the inactive polymer with the activating amount of the oxidizing enzyme. Typical lipase activities range from 10 to 100 units/mg solid protein for crude, 1000 to 400,000 units/mg solid for purified lipase. Typical esterase activities range from 10 to 100 units/mg solid protein for crude, 100 to 5000 units/mg solid for purified esterase. Typical phosphatase activities range from 1 to 100 units/mg solid protein for crude, 1000 to 5000 units/mg solid for purified phasphatase.

The catalytic amount of the oxidizing enzyme is an amount that is sufficient to crosslink the oxidlatively crosslinkable functional groups on the oxidative polymer for achieving a desired degree of crosslinking of the oxidative polymer. The degree of crosslinking is expressed as a swell ratio. The lower the swell ratio, the higher will be the crosslinking of the oxidative polymer.

The catalytic amount of the oxidizing enzyme suitable for use in the method of the present invention may vary in the range of from 25 parts per million (ppm) to 10,000 ppm, preferably in the range of from 50 ppm to 600 ppm and most preferably in the range of from 100 ppm to 300 ppm based on total polymer solids. The foregoing quantities are based on using substantially pure oxidizing enzymes. Correspondingly higher catalytic amount of the oxidizing enzyme would be required when lesser pure oxidizing enzyme is used.

The oxidizing enzyme suitable for use in the present invention include laccase, polyphenol oxidase, horseradish peroxidase, soybean peroxidase, pea peroxidase, guar beans peroxidase, garbanzo beans peroxidase, runner beans peroxidase, rice peroxidase, cotton peroxidase or mixtures thereof. Oxidizing enzymes generally have a unit activity in the range of from 20 to 1000, preferably in the range of from 100 to 1000 per mg of enzyme solids. Horseradish peroxidase, which has a unit activity in the range of from 40 to 1000, preferably in the range of from 100 to 1000 per mg of enzyme solids is particularly preferred.

The oxidizing enzymes may be employed in the form of a powder, solution, or a dispersion. The oxidizing enzymes dispersed in water are preferred and those dispersed in buffered water are more preferred. For example:

"Horseradish peroxidase (HRP)" (Donor: hydrogen-peroxide oxidoreductase; EC 1.11.1.7) is a glycoprotein with a hemin prosthetic group and bound $Ca^{++}$. The molecular weight of native horseradish peroxidase is 44,000. (Ref. Welinder, K. J., Eur. J. Biochem., 96, 483 (1979)). See also page 812 of Sigma 1997 catalog entitled "BIOCHEMICALS AND REAGENTS FOR LIFE SCIENCE RESEARCH". One of the sources of horseradish peroxidase is horseradish roots. These are roots of a hardy perennial plant (*Armoracia lapathifolia*) of the mustard family (Brassicaceae, or Cruciferae). It is a hotly pungent, fleshy root. Other sources of peroxidase include *arthromyces rarnosus*, Bovine milk (lactoperoxidase). and equine heart. HRP is supplied by Sigma Chemical, PO Box 14508, St. Louis. Mo. 63178.

"Laccase (benzenediol: oxygen oxidoreductase EC1.10.3.2)" is a copper containing glycoprotein. The molecular weight of laccase isolated from B. cinerea fungi is ~74,000 (Ref: D. Slomczynski, et al., Applied and Envionmental Microbiology, 61, 907 (1995). See also page 629 of Sigma 1997 catalog entitled "BIOCHEMICALS AND REAGENTS FOR LIFE SCIENCE RESEARCH". Sources for laccase include plants, fungal, and insects. Laccase is supplied by Sigma Chemical, PO Box 14508, St. Louis, Mo. 63178.

The degree of crosslinking achieved depends on the activity of the oxidizing enzyme used, its purity, the presence of a co-factor during the crosslinking process, temperature and the pH of the pot mix that results from the mixing of the oxidative polymer with the catalytic amount of the oxidizing enzyme. Typical peroxidase activities range from 40 units/mg solid protein for crude horseradish peroxidase to 1000 units/mg solid for purified horseradish peroxidase.

Some of the oxidizing enzymes may require the presence of an oxidant to bring about the crosslinking of the oxidative polymer. The type of an oxidant being utilized depends upon the type of oxidizing enzyme being used. For example, hydrogen peroxide having the strength in the range of 1% to 90%, preferably in the range of 5% to 50%, and most preferably in the range of 10% to 30% may be employed with horseradish peroxidase. The other suitable oxidants include ozone, atmospheric oxygen, t-butyl hydrogen peroxide, cumine hydroperoxide, perbenzoic acid, peracetic acid, m-chloroperbenzoic acid, sodium and ammonium persulfate, sodium and potassium perchlorate, sodium and potassium periodate, and sodium and potassium perbromate. t-Butyl hydrogen peroxide, hydrogen peroxide, sodium and ammonium persulfate and atmospheric oxygen are preferred. Hydrogen peroxide is more preferred.

Stability and activity of the oxidizing enzyme in addition to the temperature and pH of the pot mix also depends upon the specific enzyme and the source from which the oxidizing enzyme comes from. For example, laccase when measured over a pH range of 1.5 to 7.0 and a temperature range of 0 to 85° C. was found to have optimum activity at a pH of ~3.5 and ~50° C. However, the enzyme did show activity over the complete range of conditions evaluated. (Ref: D. Slomczynski, et al., Applied and Environmental Microbiology, 61, 907 (1995). Horseradish peroxidase was shown to be active over a pH range of at least 5 to 7.5 by J. A. Akkara, et. al (J. Polymer Science: Part A: Polymer Chemistry, 29, 1561–1574 (1991)) when used to polymerize phenolic monomers.

Thus, the pH of the pot mix may vary in the range of from 3 to 11, preferably in the range of from 5 to 10, and most preferably in the range of from 7 to 9. The pH of the pot mix may be adjusted by utilizing acids or bases, such as, sodium and potassium hydroxide; sodium and potassium carbonate; sodium and potassium bicarbonate; ammonia; amines, such as, triethanol amine, triethylamine, 2-hydroxy propylamine, hydroxyethylamine, and dihydroxyethylamine; acetic acid; formic acid; hydrochloric acid; sulfuric acid; nitric acid; benzoic acid; sodium and potassium bisulfate; phosphoric acid; phosphorous acid and combinations thereof. Ammonia is preferred when it is desired to raise the pH. Phosphoric acid is preferred when it is desired to lower the pH.

The present invention is also directed to a two-pack composition which includes a polymeric component and a catalytic component. The oxidative polymer is included in the polymeric component and a catalytic amount of the oxidizing enzyme is included in the catalytic component. Generally, the two foregoing components of the coating composition are stored separately and then mixed in a conventional way just prior to use to form a pot mix. The pot mix of the coating composition of the present invention is sufficiently fluid to allow the user to readily apply the pot mix by conventional application means, such as air-assisted spray or airless spray, roll, brush, curtain, squeegee, flood, disc, and dip-coating methods over a substrate surface.

The potlife of the pot mix depends upon a number of factors, such as for example the amount, type, purity and maintenance of the enzyme potency in the pot mix environment and the number of the oxidatively crosslinkable functionalities present on each polymer chain of the oxidative polymer and the type of the oxidatively crosslinkable functionalities present on the oxidative polymer. Generally, the potlife of the two-pack composition of the present invention varies in the range of from 10 hours to a year, typically in the range of from two weeks to six months.

The composition of the present invention may be used as a coating composition, as a molding composition, suitable for use in conventional molding methods, or in a polymer cement composite.

When utilized as a coating composition, a layer of the pot mix is conventionally applied to a substrate under ambient conditions. Once applied, the oxidatively crosslinkable functional groups on the oxidative polymer of the composition crosslink to form a coating on the substrate.

The coating composition of the present invention may contain conventional additives, such as, for example, emulsifiers, pigments, fillers, coalescing agents, antimigration aids, aqueous solutions or dispersions of non-functional polymers, curing agents, thickeners, humectants, wetting agents, biocides, plasticizers, antifoaming agents, colorants, and anti-oxidants. Examples of pigments that may be employed include clays, calcium carbonate, talc, titanium dioxide, carbon black, and various colored pigments. In the paint industry, alkyds or oils are sometimes added to promote cure and adhesion to difficult substrates. The amount of the foregoing additives added to the composition is not critical. Generally most of these additives are added to the polymeric component of the composition.

The coating compositions of the present invention may be used as top coats, intermediate coats, or primer coats and are useful as paints, wood lacquers, stains, varnishes, adhesives and inks. The substrates to which the composition of this invention may be applied include wood, plastic, leather, paper, woven and non-woven fabrics, metal, plaster, cementitious and asphaltic substrates, and previously primed or coated substrates. The coating composition may fulfill a decorative or protective function, or both, or may act as a primer or as an adhesive when disposed between two coatings or between two such substrates.

The composition is also well suited for producing articles, such as roof tiles, from a cement formulation that includes the coating composition of the present invention and cement. To produce a cement article, the pot mix is thoroughly mixed in with cement, which is then worked in a conventional roof tile making process to produce roof tiles. If desired, the pot mix/cement may contain additional components, such as, fiber glass, wood chips or wood fibers, mineral wool or combinations thereof. If desired the cement may be added to the polymeric component or the crosslinking component, which are then mixed.

If desired, the coating composition of the present invention may applied in the form of a foam layer over substrate surfaces, such as reconstituted wood substrates by including the foaming agent in the composition. The foaming techniques and methods, such as those disclosed in the U.S. Pat. Nos. 5,635,248 and 5,695,823, which are incorporated herein by reference are suitable for the composition of the present invention for producing sealer coatings on reconstituted wood substrates.

The coating composition of the present invention may be also applied in the form of a foam layer over cement substrate to reduce efflorescence on the cement substrate surface by including the foaming agent in the composition. The techniques and methods disclosed in the U.S. Pat. No. 5,718,943, which is incorporated herein by reference are suitable for the composition of the present invention for producing efflorescent resistant coatings on cement substrate surfaces.

Swell Ratio Procedure

A polymer film having a dry film thickness of 50 microns was prepared by applying a layer of a pot mix with a conventional draw-down bar over a film releasing substrate made from Teflon® tetrafluroethylene, supplied by DuPont Company, Wilmington, Del. The layer was dried at room temperature for various time durations, specified in Examples below, to produce the dry film. The film was then peeled off from the film releasing substrate and cut into 1 cm square test specimens. The test specimens were immersed in methyl ethyl ketone for 1 hour. The degree of swelling is determined by measuring the width of the immersed specimen after 1 hour of soaking in methyl ethyl ketone. A swell ratio of the film was calculated to determine the extent of crosslinking that was achieved by the oxidizing enzyme. The swell ratio is calculated by using the following equation:

Swell Ratio=(width of the immersed specimen)$^3$/(1 cm)$^3$

A swell ratio of 20 or less is usually indicative of polymer crosslinking. A swell ratio of from 10 to 15 is indicative of light crosslinking. A swell ratio of 5 to 10 is indicative of moderate crosslinking. A swell ratio of from 1 to 5 is indicative of high crosslinking.

MEK Rubs Procedure

A polymer film having a dry film thickness of 50 microns was prepared by applying a layer of a pot mix with a conventional draw-down bar over an aluminum panel substrate. The layer was dried at room temperature for various time durations, specified in Examples below, to produce a coating on the panel. MEK double rubs were tested by using a Crockmeter, supplied by Atlas Electrical Services Company, Chicago, Ill., by mounting the coated panel on the Crockmeter, applying methyl ethyl ketone to the cheese cloth wrapped on the rubbing probe of the Crockmeter, and placing the probe on the surface of the coating on the panel. The MEK double rub end point was determined by the number of back and forth strokes of the probe on the coating required to expose the underlying substrate. The higher the number of strokes required to expose the underlying surface, better will be the crosslinking of the oxidative polymer achieved by the method of the present invention.

| Abbreviations used in Examples below | |
|---|---|
| AAEM | Acetoacetoxy ethyl methacrylate |
| BMA | Butyl methacrylate |
| BA | butyl acrylate |
| MAA | Methacrylic Acid |
| MMA | Methyl Methacrylate |
| n-DDM | n-Dodecyl Mercaptan-Chain transfer agent (CTA) |

EXAMPLE 1

To a 3 liter stirred reactor containing 437.8 g. of deionized water (DI water) heated to 85° C. under a nitrogen atmosphere, was added 0.5 grams of ammonium hydroxide (28% active), 74 grams of a polymer seed latex (solids content 41.5%, average particle diameter of 60 nm), and 27.5 grams of DI water followed by a solution of 1.72 grams of ammonium persulfate in 12.5 grams of DI water to form a reaction mixture. The following dormant monomer mixture was then added to the reaction mixture over 150 minutes along with a solution of 1 gram of ammonium persulfate dissolved in a solution of 4 grams of ammonium hydroxide and 47.5 grams of DI water. After the feeds were completed, the dormant monomer mixture container was rinsed with 50 grams of DI water and the ammonium persulfate container was rinsed with 5 grams of DI water. These rinses were then added to the reaction mixture.

| Monomer Mix: | in grams (g) |
|---|---|
| DI water | 233.0 |
| surfactant* (58% active) | 13.0 |
| butyl methacrylate | 559.8 |
| butyl acrylate | 177.8 |
| acetoxy styrene (97% active) | 104.2 |
| styrene | 151.6 |
| methacrylic acid | 20.2 |
| n-Dodecanethiol | 2.5 |
| DI water rinse | 65.0 |

*ammonium salt of a sulfated alkylphenol ethoxylate with an average of 4 moles of ethylene oxide.

Upon completion of the polymerization, 0.005 grams of FeSO4 in 3.3 grams of DI water, 0.16 grams of tetrasodium salt of ethylenediamine tetraacetic acid in 16.3 grams of DI water, 1.2 g of t-butylhydroperoxide in 15 grams of DI water and 1.23 grams of isoascorbic acid in 33.6 grams of DI water were added at 65° C. to the reaction product. The reaction mixture was diluted with 40.35 grams of DI water. The resulting inactive polymer had a solids content of 50.2% and an average particle diameter of 189 nm.

A 20 gram sample of the forgoing inactive polymer was then mixed with 2 grams of butyl Cellosolve cosolvent. To the mixture, 0.5 ml of E-3128 (EC 3.1.1.1) esterase supplied by Sigma Chemical, PO Box 14508, St. Louis, Mo. 63178 (1 ml contains 15 mg of enzyme and there are 300 units/mg. One unit will hydrolyze 1 micromole of ethyl butyrate per minute at pH 8 and 25° C.) was added to generate a phenolic functionality on the inactive polymer. Thereafter, 0.150 ml of P-6410 horseradish peroxidase supplied by Sigma Chemical, St. Louis, Mo. 63178 was added (0.15 ml is equivalent to 3.15 mg enzyme having 250 units activity per mg). The mixture was then conventionally applied to a plastic sheet as a clear layer having a dry film thickness of 50 microns. The layer was air dried for 7 days to form a film. Thereafter, specimens of the film were removed and measured for the degree of crosslinking achieved by the oxidizing enzyme. The film was found to have a swell ratio of 3.4 indicating significant crosslinking of the oxidative polymer by the oxidizing enzyme.

For comparison, a film from a mixture containing all the foregoing components, except for horseradish peroxidase was applied and air dried in a similar fashion. The dry film dissolved in methyl ethyl ketone indicating lack of crosslinking of the oxidative polymer.

EXAMPLE 2

To a 3 liter stirred reactor containing 423.1 g. of deionized water (DI water) heated to 85° C. under a nitrogen atmosphere, was added 0.5 grams of ammonium hydroxide (28% active), 74 grams of a polymer seed latex (solids content 41.5%, average particle diameter of 60 nm), and 27.5 grams of DI water followed by a solution of 1.72 grams of ammonium persulfate in 12.5 grams of DI water to form a reaction mixture. The following dormant monomer mixture was then added to the reaction mixture over 150 minutes along with a solution of 1 gram of ammonium persulfate dissolved in a solution of 4 grams of ammonium hydroxide and 47.5 grams of DI water. After the feeds were completed, the dormant monomer mixture container was rinsed with 50 grams of DI water and the ammonium persulfate container were rinsed with 5 grams of DI water. These rinses were then added to the reaction mixture.

| Monomer Mix: | in grams (g) |
|---|---|
| DI water | 233.0 |
| surfactant* (58% active) | 13.0 |
| butyl methacrylate | 360.7 |
| butyl acrylate | 275.9 |
| acetoxy styrene (97% active) | 208.4 |
| styrene | 151.6 |
| methacrylic acid | 20.2 |
| n-Dodecanethiol | 2.5 |
| DI water rinse | 65.0 |

*ammonium salt of a sulfated alkylphenol ethoxylate with an average of 4 moles of ethylene oxide.

Upon completion of the polymerization, 0.005 grams of FeSO4 in 3.3 grams of DI water, 0.16 grams of tetrasodium salt of ethylenediamine tetraacetic acid in 16.3 grams of DI water, 1.2 g of t-butylhydroperoxide in 15 grams of DI water and 1.23 grams of isoascorbic acid in 33.6 grams of DI water were added at 65° C. to the reaction product. The reaction mixture was diluted with 40.35 grams of DI water. The resulting inactive polymer had a solids content of 49.8% and an average particle diameter of 204 nm.

A 20 gram sample of the forgoing inactive polymer was then mixed with 2 grams of Butyl Cellosolve cosolvent. To the mixture, 0.3 ml of E-3128 (EC 3.1.1.1) esterase supplied by Sigma Chemical, St. Louis, Mo. (1 ml contains 15 mg of enzyme and there are 300 units/mg. One unit will hydrolyze 1 micromole of ethyl butyrate per minute at pH 8 and 25° C.) was added to generate a phenolic functionality on the inactive polymer. Thereafter, 0.150 ml of P-6140 horseradish peroxidase supplied by Sigma Chemical, PO Box 14508, St. Louis, Mo. 63178 was added (0.15 ml is equivalent to 3.15 mg enzyme having 250 units activity per mg). The mixture was then conventionally applied to a plastic sheet as a clear layer having a dry film thickness of 50 microns. The layer was air dried for 7 days to form a film. Thereafter, specimens of the film were removed and measured for the degree of crosslinking achieved by the oxidizing enzyme. The film was found to have a swell ratio of 4.5 indicating significant crosslinking of the oxidative polymer by the oxidizing enzyme.

For comparison, a film from a mixture containing all the foregoing components, except for horseradish peroxidase was applied and air dried in a similar fashion. The dry film dissolved in methyl ethyl ketone indicating lack of crosslinking of the oxidative polymer.

EXAMPLE 3

A 20 gram sample of the forgoing inactive polymer was then mixed with 2 grams of Butyl Cellosolve cosolvent. To the mixture, 1 g of E-1754 (EC 3.1.1.3) lipase supplied by Sigma Chemical, PO Box 14508, St. Louis, Mo. 63178 (There are 950 units/mg and one unit will hydrolyze 1 micro equivalent of fatty acid from olive oil in one hour at pH 7.2 at 37° C.) was added to generate a phenolic functionality on the inactive polymer. Thereafter, 0.150 ml of P-6140 horseradish peroxidase supplied by Sigma Chemical, PO Box 14508, St. Louis, Mo. 63178 was added (0.15 ml is equivalent to 3.15 mg enzyme having 250 units activity per mg). The mixture was then conventionally applied to a plastic sheet as a clear layer having a dry film thickness of 50 microns. The layer was air dried for 7 days to form a film. Thereafter, specimens of the film were removed and measured for the degree of crosslinking achieved by the oxidizing enzyme. The film was found to have a swell ratio of 2.9 indicating significant crosslinking of the oxidative polymer by the oxidizing enzyme.

For comparison, a film from a mixture containing all the foregoing components, except for horseradish peroxidase was applied and air dried in a similar fashion. The dry film dissolved in methyl ethyl ketone indicating lack of crosslinking of the oxidative polymer.

EXAMPLE 4

To a 5 liter stirred reactor containing 797.0 g. of deionized water (DI water) heated to 90° C. under a nitrogen atmosphere, was added 148 grams of a polymer seed latex (solids content 41.5%, average particle diameter of 60nm), 40 grams of DI water and a solution of 3.45 grams of ammonium persulfate in 25 grams of DI water to form a reaction mixture. The following oxidative monomer mixture was then added to the reaction mixture over 120 minutes along with a solution of 2 gram of ammonium persulfate dissolved in a solution of 9.1 grams of ammonium hydroxide and 95 grams of DI water. The oxidative monomer mixture container was rinsed with 230 grams of DI water and the ammonium persulfate container was rinsed with 10 grams of DI water. Both of the rinses were added to the reaction mixture.

| Monomer Mix: | in grams (g) |
| --- | --- |
| DI water | 466.0 |
| ammonium lauryl sulfate (26.7% active) | 56.0 |
| Methyl methacrylate | 666.9 |
| butyl acrylate | 808.4 |
| acetylacetoxyethyl methacrylate | 202.1 |
| styrene | 303.2 |
| methacrylic acid | 40.4 |
| n-Dodecanethiol | 5.1 |

Upon completion of the polymerization, 0.01 grams of $FeSO_4$ in 6.6 grams of DI water, 0.3 grams of tetrasodium salt of ethylenediamine tetraacetic acid in 32.6 grams of DI water, 1.8 g of t-butylhydroperoxide in 20 grams of DI water and 1.64 grams of isoascorbic acid in 30 grams of DI water were added at 65° C. to the reaction product. The reaction mixture was neutralized with 68 grams of ammonium hydroxide (28.8% active) and diluted with 147.5 grams of DI water. The resulting oxidative polymer had a solids content of 49.3% and an average particle diameter of 189 nm.

$TiO_2$ grind [16.4 g Ti Pure® titanium dioxide supplied by DuPont Company, Wilmington, Del., 0.7 g dispersing, 0.1 g ammonia (28% strength), 0.2 g surfactant, 0.1 g defoamer, and 1.6 g water] mixed with 54 g of the oxidative polymer and 8 grams of Butyl Cellosolve cosolvent, 1.5 grams of propylene glycol was added to 12.6 grams of water to form a paint. To the paint, 0.6 ml of P-6140 horseradish peroxidase P-6140 (EC 1.11.1.7) supplied by Sigma Chemical, PO Box 14508, St. Louis, Mo. 63178 (1 ml contains 21 mg enzyme which has an activity of 250 units/mg. One unit will form 1 mg of purpurogallin from pyrogallol in 20 sec. at pH 6 and 20 C.) was added (0.15 ml is equivalent to 3.15 mg enzyme having 250 units activity per mg). The pot mix was then conventionally applied to a plastic sheet as a clear layer having a dry film thickness of 50 microns. The layer was air dried for 4 days to form a film. Thereafter, specimens of the film were removed and measured for the degree of crosslinking achieved by the oxidizing enzyme. The film was found to have a swell ratio of 5.7 indicating significant crosslinking of the oxidative polymer by the oxidizing enzyme.

For comparison, a film from a mixture containing all the foregoing components, except for horseradish peroxidase was applied and air dried in a similar fashion. The dry film had a swell ratio of 7 in methyl ethyl ketone indicating less crosslinking of the oxidative polymer in the absence of the oxidizing enzyme.

A layer having a dry film thickness of 50 microns was applied over Crockmeter test panel, which was then dried for 11 days under ambient condition to form a coating on the substrate panel. When the coating was subjected to MEK rubs test, 83 double rubs were required before the coating cut through to expose the underlying substrate surface.

A similar paint coating prepared without adding any horseradish peroxidase, produced a coating that required 35 MEK double rubs before the coating cut through to expose the underlying substrate surface.

From the foregoing Examples, it can be seen that the presence of the oxidizing enzyme improves the crosslinking of the oxidative polymer and coating resulting therefrom has improved properties, such scrub resistance over those coatings that are not crosslinked by the oxidizing enzyme.

EXAMPLE 5

Flasks containing 20 g each of the polymer of Example 4 were pH-adjusted with ammonia in accordance with Table 1 below. Horseradish peroxidase P-6140 (EC 1.11.1.7) supplied by Sigma Chemical, PO Box 14508, St. Louis, MO. 63178 was then mixed with these polymers in various amounts shown in Table 1 below to form various pot mixes. Swell ratios of films resulting from these pot mixes were measured after 7 days of drying the layer.

TABLE 1

| pH of Polymer | mg of enzyme mixed with polymer | Swell Ratio of cross linked polymer |
| --- | --- | --- |
| 9.04 | 0 | 9.4 |
| 9.04 | 0.300 | 8.3 |
| 7.1 | 0.300 | 6.2 |
| 9.04 | 0.150 | 8.8 |
| 7.1 | 0.150 | 6.7 |
| 9.04 | 0.75 | 9.0 |
| 7.1 | 0.75 | 7.1 |

From Table 1, it can be seen that as the pH of the pot mix drops to 7 from 9.4, increased crosslinking of the oxidative polymer by the oxidizing enzyme occurs even at various levels of enzyme additions.

EXAMPLE 6

Flasks containing 20 g each of the polymer in Example 4 were adjusted with ammonia to a pH of 9.04. To these flasks, horseradish peroxidase P-6140 (EC 1.11.1.7) supplied by Sigma Chemical, PO Box 14508, St. Louis, Mo. 63178 was mixed in various amounts shown in Table 2 below to form various pot mixes. Swell ratios of the films resulting from these pot mixes were measured after 4 days and after 11 days of drying.

TABLE 2

| Peroxidase, mg wet* | Swell Ratio (4 day) | Swell Ratio (11 day) |
| --- | --- | --- |
| 0 | 10.3 | 9.3 |
| 0.75 | 10.1 | 8.8 |
| 0.75** | 10.1 | 8.6 |
| 0.150 | 9.7 | 8.5 |
| 0.300 | 8.9 | 7.9 |

*1 mg wet peroxidase contains 21 mg enzyme which has an activity of 250 units/mg.
**also contains 1.6 grams of hydrogen peroxide at 10% concentration.

Table 2 above demonstrates that the oxidizing enzyme will effectively crosslink the oxidative polymer at a wide range of concentrations and by increasing the drying time, higher degree of crosslinking can be achieved. Furthermore, applicants have unexpectedly discovered that it is not necessary to include an oxidant, such as hydrogen peroxide, to attain almost the same degree of crosslinking achieved by the oxidizing enzyme, such as horseradish peroxidase. As a result, negative effects, such as brittleness of a coating or loss of adhesion of a coating to an underlying substrate that may occur when a coating composition contains an oxidant, are reduced.

EXAMPLE 7

Flasks containing 20 g each of the polymer of Example 4 were adjusted with ammonia to a pH of 9.04. To these flasks, laccase (EC 1.10.3.2) was mixed in various amounts shown in Table 3 below to form various pot mixes. Swell ratios of the films made from these pot mixes were measured after 4 days and after 11 days of drying.

TABLE 3

| Laccase, ml wet* | Swell Ratio (4 day) | Swell Ratio (11 day) |
| --- | --- | --- |
| 0 | 10.3 | 9.3 |
| 0.05 | 9.8 | 8.0 |
| 0.15 | 9.7 | 7.9 |

*1 ml wet laccase contains 0.79 mg enzyme which has an activity of 1000 units/microliter.

Table 3 above demonstrates that the oxidizing enzyme will effectively crosslink the oxidative polymer at a wide range of concentrations and increase in the drying time improves the degree crosslinking achieved.

What is claimed is:

1. A method of crosslinking an oxidative polymer having oxidatively crosslinkable functional groups, said method comprising:

contacting said oxidative polymer with a catalytic amount of an oxidizing enzyme; and crosslinking said oxidatively crosslinkable functional groups on said oxidative polymer;

wherein said oxidative polymer comprises as polymerized units at least one ethylenically unsaturated monomer.

2. The method of claim 1 wherein said crosslinking is conducted at ambient temperature.

3. The method of claim 1 wherein said oxidizing enzyme is selected from the groups consisting of laccase, polyphenol oxidase, horseradish peroxidase, soybean peroxidase, pea peroxidase, guar beans peroxidase, garbanzo beans peroxidase, runner beans peroxidase, rice peroxidase, cotton peroxidase and mixtures thereof.

4. The method of claim 1 wherein said oxidizing enzyme is an aqueous solution at a pH varying in the range of from 3 to 11.

5. The method of claim 1 wherein said oxidatively crosslinkable functional groups are selected from the group consisting of phenolic, active methylene, amino, allylic, vinylic, acrylic, methacrylic, itaconic, maleic, mercapto, sulfide, phosphino groups and combinations thereof.

6. The method of claim 1 wherein said catalytic amount varies in the range of from 25 ppm to 10,000 ppm.

7. The method of claim 1 wherein said oxidative polymer is a powder, a dispersed polymer, a solubilized polymer, or a mixture thereof.

8. The method of claim 1 wherein said oxidatively crosslinkable functional groups on said oxidative polymer are produced by contacting an inactive polymer having dormant functional groups with an activating amount of an activating agent.

9. The method of claim 1 further comprising:

applying onto a substrate a layer of said oxidative polymer in contact with said catalytic amount of said oxidizing enzyme prior to crosslinking said oxidatively crosslinkable functional group on said oxidative polymer.

* * * * *